(12) United States Patent
Roth et al.

(10) Patent No.: US 9,122,006 B1
(45) Date of Patent: Sep. 1, 2015

(54) INTEGRATED POLARIZATION SPLITTER AND ROTATOR

(71) Applicant: Aurrion, Inc., Goleta, CA (US)

(72) Inventors: Jonathan Edgar Roth, Santa Barbara, CA (US); Gregory Alan Fish, Santa Barbara, CA (US)

(73) Assignee: Aurrion, Inc., Goleta, CA (US)

( * ) Notice: Subject to any disclaimer, the term of this patent is extended or adjusted under 35 U.S.C. 154(b) by 184 days.

(21) Appl. No.: 13/779,590

(22) Filed: Feb. 27, 2013

(51) Int. Cl.
*G02B 6/00* (2006.01)
*G02B 6/26* (2006.01)
*G02B 6/126* (2006.01)
*G02B 6/14* (2006.01)
*G02B 6/10* (2006.01)
G02B 6/27 (2006.01)

(52) U.S. Cl.
CPC .......... *G02B 6/126* (2013.01); *G02B 6/105* (2013.01); *G02B 6/14* (2013.01); G02B 6/274 (2013.01)

(58) Field of Classification Search
CPC ........ G02B 6/105; G02B 6/12; G02B 6/1228; G02B 6/126; G02B 6/14; G02B 6/27; G02B 6/274
USPC .................. 385/11, 14, 24, 27–29, 43, 49–50
See application file for complete search history.

(56) References Cited

U.S. PATENT DOCUMENTS

| | | | |
|---|---|---|---|
| 5,159,699 A | 10/1992 | de Monts | |
| 6,870,992 B2 | 3/2005 | Grosjean et al. | |
| 6,987,913 B2 | 1/2006 | Blauvelt et al. | |
| 7,050,681 B2 | 5/2006 | Blauvelt et al. | |
| 7,095,920 B1 | 8/2006 | Little | |
| 2009/0245316 A1 | 10/2009 | Sysak et al. | |
| 2012/0057816 A1 | 3/2012 | Krasulick et al. | |
| 2013/0028557 A1* | 1/2013 | Lee et al. .................. | 385/28 |

FOREIGN PATENT DOCUMENTS

| | | |
|---|---|---|
| EP | 2463694 | 6/2012 |
| WO | WO-03042734 | 5/2003 |

OTHER PUBLICATIONS

Extended European Search Report for European Patent Application No. 14000807.9, mailed Jun. 16, 2014, 6 pages.
Non-Final Office Action for U.S. Appl. No. 13/899,336, mailed May 5, 2014, 11 pages.
Ding, et al., Fabrication tolerant polarization splitter and rotator based on a tapered directional coupler, © 2012 Optical Society of America, Aug. 27, 2012 / vol. 20, No. 18 / Optics Express 20021, 7 pages.

(Continued)

*Primary Examiner* — Akm Enayet Ullah
*Assistant Examiner* — Michael Mooney
(74) *Attorney, Agent, or Firm* — Schwegman Lundberg & Woessner, P.A.

(57) ABSTRACT

Embodiments of the invention describe photonic integrated circuits (PICs) for accomplishing polarization splitting and rotation. Embodiments of the invention include a first waveguide to receive light comprising orthogonally polarized transverse electric (TE) and transverse magnetic (TM) modes, and a second waveguide disposed below the first waveguide and comprising a reverse taper-shaped side to adiabatically receive one of the polarization modes (e.g., the TE mode) of the received light from the first waveguide. Said horizontal offset between the first and the reverse taper-shaped side of the second waveguide comprises an offset such that, for example, the TM mode of the received light is rotated to a TE mode in the first waveguide. The above described offsets and taper shaped structures may also be used in an optical combiner.

27 Claims, 4 Drawing Sheets

(56) References Cited

OTHER PUBLICATIONS

Doerr, et al., Wide Bandwidth Silicon Nitride Grating Coupler, IEEE Photonics Technology Letters, vol. 22, No. 19, Oct. 1, 2010, © 2010 IEEE, (Oct. 19, 2010), 3 pages.

Fan, et al., "High Directivity, Vertical Fiber-to-Chip Coupler with Anisotropically Radiating Grating Teeth," © 2007 Optical Society of America, © OSA 1-55752-834-9, (2007), 2 pages.

Ishii, et al., "SMT—Compatible Optical-I/O Chip Packaging for Chip-Level Optical Interconnects," (C)2001 IEEE, 2001 Electronic Components and Technology Conference, (2001), 6 pages.

Little, Brent E., et al., "Design Rules for Maximally Flat Wavelength-Insensitive Optical Power Dividers Using Mach-Zehnder Structures," IEEE Photonics Technology Letters, vol. 9, No. 12, Dec. 1997, IEEE 1997, (Dec. 12, 1997), pages.

Liu, Liu, et al., "Silicon-on-insulator polarization splitting and rotating device for polarization diversity circuits," © 2011 Optical Society of America, (C) 2011 OSA, Jun. 20, 2011 / vol. 19, No. 13 / Optics Express 12646, pp. 6.

Vermeulen, et al., "High-efficiency fiber-to-chip grating couplers realized using an advanced CMOS-compatible Silicon-On-Insulator platform," © 2010 Optical Society of America, (C) 2010 OSA, Aug. 16, 2010 / vol. 18, No. 17 / Optics Express 18278, (2010), 6 pgs.

\* cited by examiner

INTEGRATED POLARIZATION SPLITTER AND ROTATOR

FIELD

Embodiments of the invention generally pertain to optical devices and more specifically to photonic integrated circuits to accomplish polarization splitting and rotation.

BACKGROUND

When light is coupled to a photonic integrated circuit (PIC) after propagating through a single mode optical fiber, the polarization state of the optical mode will typically be of an unknown and uncontrolled polarization. Many components in a PIC have polarization-dependent behavior, meaning the component will have a different transfer function for the different polarization modes (e.g., TE0, TM0).

A polarization diversity approach in a PIC describes when TE0 and TM0 components of received light are split and then processed separately. To accomplish the diversity approach, a component is required to split the TE0 and TM0 modes into different waveguides. A desirable feature in a polarization diversity approach is that two circuits that process the two input polarizations may be of identical design. For this to be possible a component is required to rotate light, in other words convert it from a TE0 mode to a TM0 mode or vice versa. Current solutions that enable this splitting and rotation in waveguides require separate devices for each function, thereby increasing the cost and manufacturing complexity of the PIC.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe photonic integrated circuits (PICs) for accomplishing polarization splitting and rotation. Embodiments of the invention include a first waveguide to receive light comprising orthogonally polarized transverse electric (TE) and transverse magnetic (TM) modes, and a second waveguide disposed below the first waveguide and comprising a reverse taper-shaped side to adiabatically receive one of the polarization modes (e.g., the TE mode) of the received light from the first waveguide. Said horizontal offset between the first and the reverse taper-shaped side of the second waveguide comprises an offset such that, for example, the TM mode of the received light is rotated to a TE mode in the first waveguide.

Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
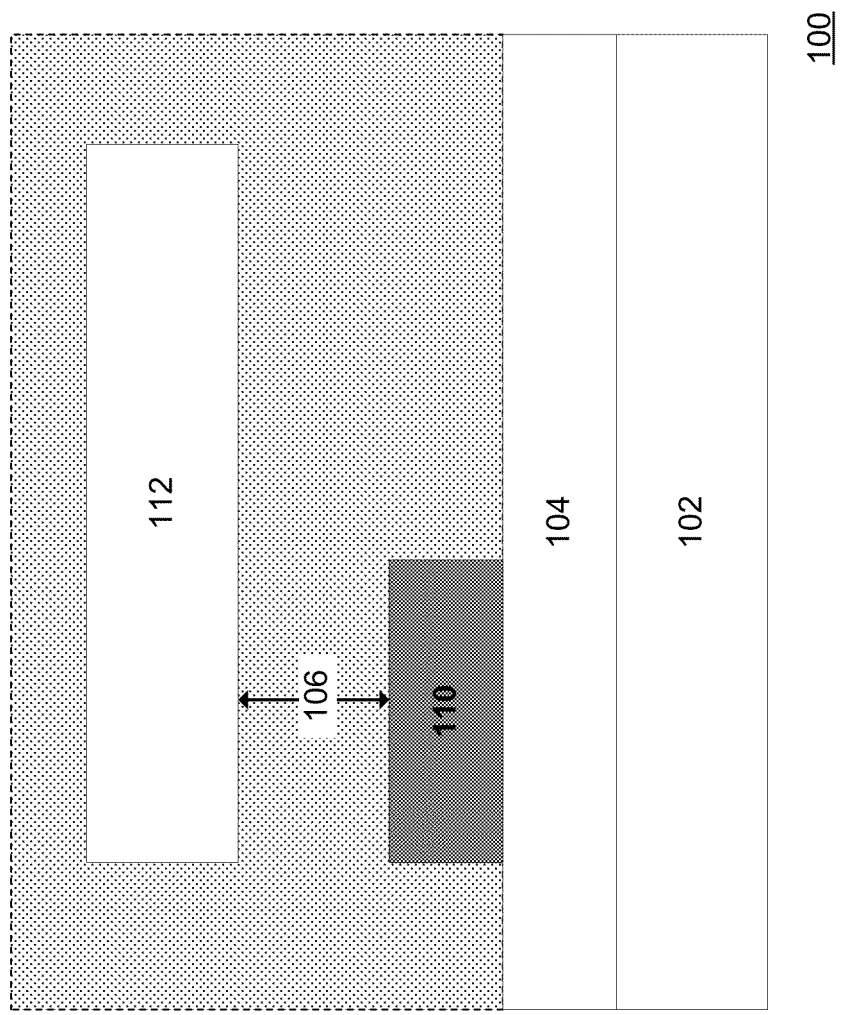
FIG. 1 is an illustration of a cross sectional view of an integrated polarization splitter and rotator according to an embodiment of the invention.

FIG. 1 is an illustration of a cross sectional view of an integrated polarization splitter and rotator according to an embodiment of the invention. In this embodiment, splitter/rotator 100 includes substrate layer 102, buried oxide (BOX) layer 104, and waveguides 110 and 112 (separated by oxide gap 106), wherein waveguide 110 is a silicon (Si) waveguide (e.g., an Si wire waveguide) and waveguide 112 is a silicon nitride (SiN) waveguide.

In this example embodiment, silicon wire waveguide 110 is etched in the top-Si layer of an SOI wafer comprising substrate layer 102 and BOX layer 104. Silicon dioxide is deposited and planarized, and then an SiN layer is deposited above the silicon dioxide; SiN waveguide 112 is then etched. The above described fabrication process is an example process for forming that the silicon and silicon nitride waveguides as illustrated in FIG. 1 such that they are disposed on top of one another and separated by layer of silicon dioxide 106.

In order to accomplish polarization rotation in a waveguide structure, breaking both vertical and horizontal symmetry along its cross section is required; waveguide 110 and 112 are illustrated in FIG. 1 to be asymmetrically positioned in this manner. Polarization splitters in prior art solutions may be fabricated in silicon wire waveguides with silicon dioxide cladding, but the same fabrication platform is not sufficient for polarization rotation without additional fabrication steps. In this embodiment, the two dissimilar waveguide cores of waveguides 110 and 112 are disposed on top of one another to break vertical symmetry where both waveguides are present; the use of off-center waveguides, as shown in FIG. 1, breaks horizontal symmetry.

Figure 2:
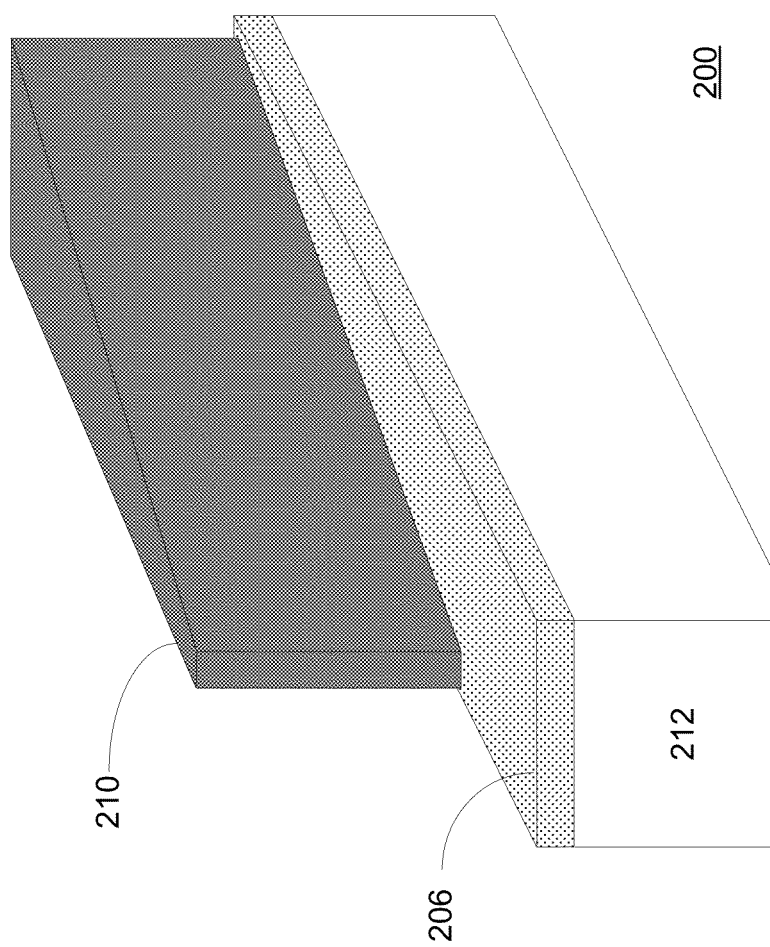
FIG. 2 is a side view of an integrated polarization splitter and rotator according to an embodiment of the invention.

FIG. 2 is a side view of an integrated polarization splitter and rotator according to an embodiment of the invention. In this embodiment, polarization splitter and rotator 200 includes SiN waveguide 212 and Si wire waveguide 210 disposed on top of one another, separated by silicon dioxide layer 206.

As described above, in order to rotate the polarization of light (e.g., convert a TE mode to a TM mode) the waveguide structure of polarization splitter and rotator 200 may break horizontal and vertical symmetry. Thus, waveguides 212 and 210 are shown to be vertically off-center from one another; however, polarization splitting does not necessarily utilize the above described vertical asymmetry.

In this embodiment, SiN waveguide 212 is to receive light comprising orthogonally polarized transverse electric (TE) and transverse magnetic (TM) modes. Waveguide 210 is shown to comprise a reverse taper to adiabatically receive the TE mode of the received light from the first waveguide. A 'taper,' as referred to herein may describe a single taper or a segmented taper (e.g., a taper having some segments to influence mode conversion and other segments with large taper angles to shorten the overall length of taper-shaped side).

The horizontal offset between SiN waveguide 212 and the reverse taper-shaped side of waveguide 210 comprises an offset such that the TM mode of the received light that is rotated to a TE mode in the SiN waveguide remains in the SiN waveguide. Thus, TE and TM modes of the received light are separated, while the TM mode of the received light is rotated to a TE mode via mode evolution. Alternatively, in other embodiments said waveguides may be configured so that they both receive TM mode light.

Figure 3:
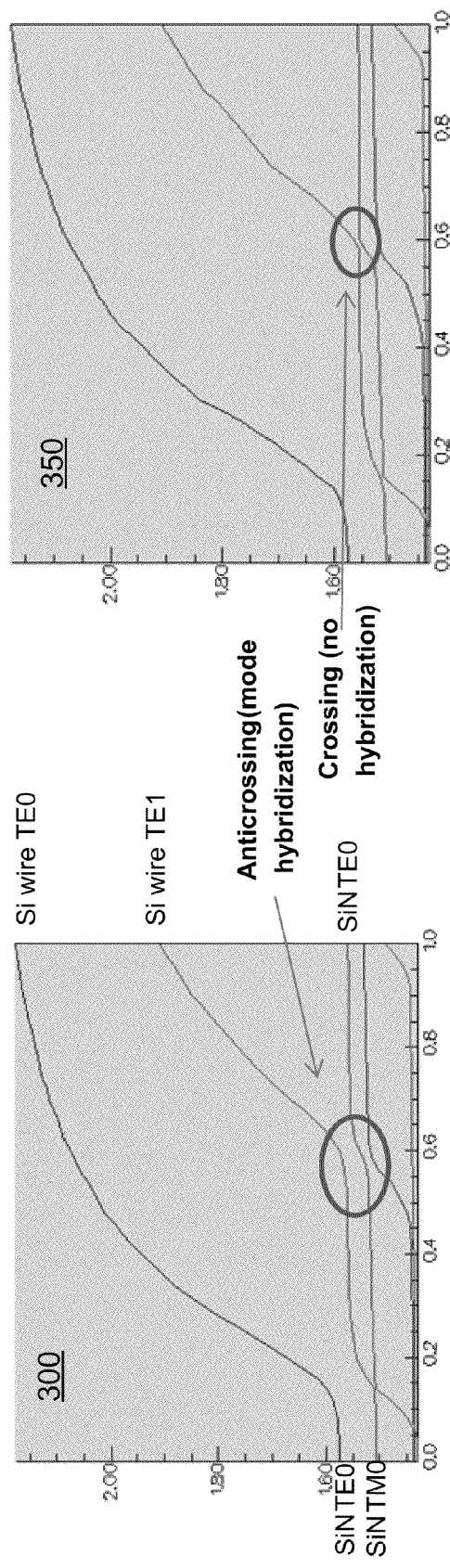
FIG. 3 includes illustrations of mode evolutions that do and do not occur in an integrated polarization splitter and rotator according to an embodiment of the invention.

FIG. 3 includes illustrations of mode evolutions that do and do not occur in an integrated polarization splitter and rotator according to an embodiment of the invention. In this illustration, graph 300 illustrates the effective indices for the modes vs. position along the taper for an SiN waveguide and an Si wire waveguide vertically and horizontally offset as described above and illustrated in FIG. 1 and FIG. 2.

Embodiments of the invention are not limited to waveguides comprising different materials. The two waveguides may be made from the same material using similar or dissimilar thicknesses. Waveguide materials may also include, for example, epitaxially grown III-V materials. Substrates may also be made from III-V materials. Furthermore, one of the waveguides could be made from a material which was formed on a separate substrate and heterogeneously integrated to another substrate.

Graph 300 indicates example polarization modes for SiN and Si wire waveguides (e.g., TE0, TM0, TE1, TM1 . . . ). Said polarization modes may be determined according to the kind of material forming the optical waveguide, the optical constant thereof and the structure, and waveguide dimensions, and is generally obtained by numerical calculation.

In this illustration, SiN TE0 mode light is shown to convert to Si wire TE0 light i.e., the TE mode of the wider SiN TE0 waveguide is coupled to the TE mode of the Si wire waveguide as the reverse taper structure of the Si wire waveguide widens. Furthermore, the SiN TM0 mode light is shown to transition to SiN TE0 light. An anticrossing of the modes (alternatively referred to as mode hybridization) is circled in the diagram where TE and TM modes hybridize with one another. Anticrossings occur when two modes of nearly the same index are non-orthogonal, and are close enough spatially to overlap with one another. Such mode hybridization occurring along an adiabatic taper structure (e.g., the inverse taper structure shown in Si wire waveguide 210 of FIG. 2 introduces a mode conversion). In general, along an adiabatic taper, if the modes at either end of the taper are counted in the order of their effective index, the modes maintain their order from one end to another, as long as there are only anticrossings between modes along the taper and no crossings.

Graph 350 illustrates the evolution of effective index vs. position along the taper for an SiN waveguide and an Si wire waveguide that are not off-center—i.e., there is horizontal symmetry along the above described taper. In this case there is a crossing circled where the TE and TM modes do not hybridize with one another, and Si TM0 mode light converts to Si TE1 light. This behavior does not provide the desired polarization splitting, and thus is not utilized in embodiments of the invention.

Figure 4:
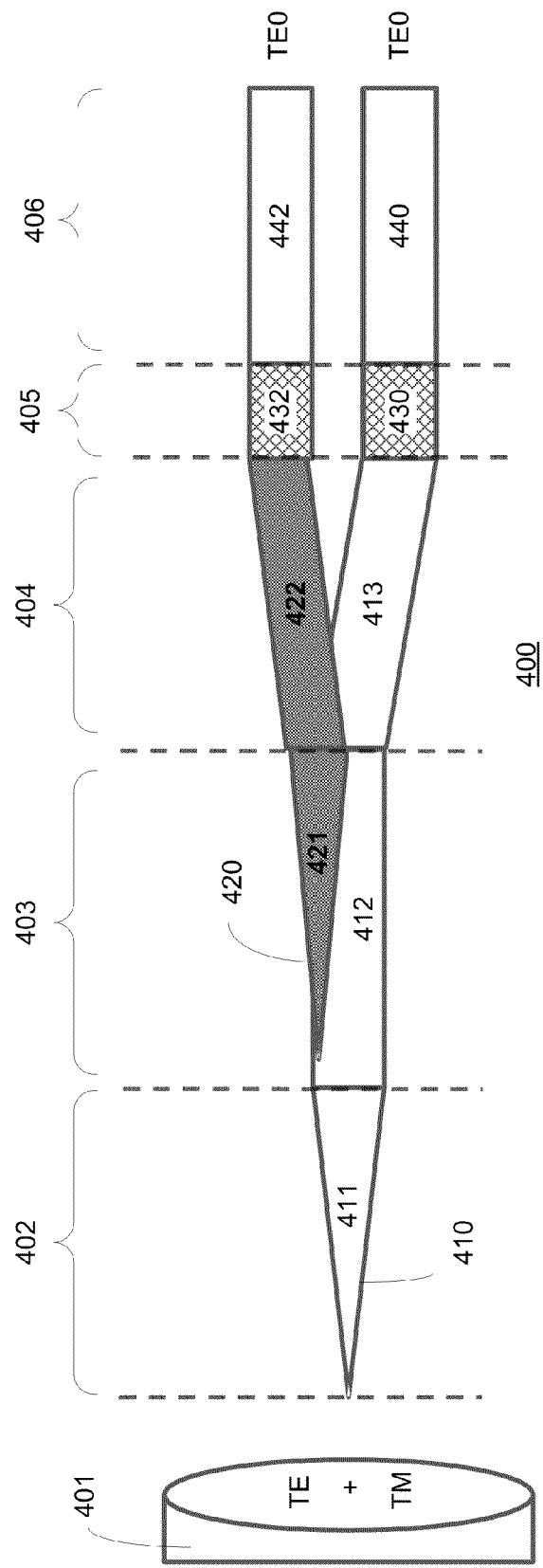
FIG. 4 is an illustration of a photonic integrated circuit including an integrated polarization splitter and rotator according to an embodiment of the invention.

FIG. 4 is an illustration of a PIC including an integrated polarization splitter and rotator according to an embodiment of the invention. In this embodiment, PIC 400 includes sections 402-406 (described below) to receive light from fiber component 401 (e.g., light having a wavelength in the C-band range or the O-band range). Said PIC includes SiN waveguide 410 (including waveguide sections 411-413 described below), Si wire waveguide 420 (including waveguide sections 421-422 described below), waveguide mode converters 430 and 432, and output waveguides 440 and 442.

Section 402 of PIC 400 is shown to include waveguide section 411 of SiN waveguide 410, which comprises an inverse taper structure. In this embodiment, inverse taper 411 converts the spot size of the received light from the larger mode of fiber 401 to the smaller mode of waveguide 410. At this portion of the waveguide, the received light comprises both SiN TE0 mode and SiN TM0 mode. The tip of inverse taper 411 makes the beam of the received light large, and expanding from said tip confines light (i.e., the beam becomes confined more in SiN waveguide 410 as the inverse taper gets wider). Said spot size converter may be utilized, for example, in PICs for separating the orthogonal modes received on the PIC from a single mode fiber.

Section 403 of PIC 400 is shown to further include section 412 of SiN waveguide 410 overlapping section 421 of Si wire waveguide 420. In this embodiment, section 421 of Si wire waveguide 420 comprises an inverse taper structure. Si inverse taper section 421 is shown to be disposed off-center w/SiN waveguide section 412. As described above, this offset breaks horizontal and vertical symmetry to rotate the SiN TM0 mode of the input light to an SiN-core TE0 mode and split the input SiN TE0 and TM0 modes into separate waveguides by converting the SiN TE0 mode of the input light to an Si-core TE0 mode.

Section 404 of PIC 400 is shown to further include section 413 of SiN waveguide 410 and section 422 of Si wire waveguide 420 forming a lateral offset taper that separates the Si wire and SiN waveguides so they do not overlap vertically. At this stage of each waveguides, a TE0 mode of light is in their respective segment. Other embodiments may utilize different polarization modes. Section 404 does not convert the modes but merely separates them spatially. As waveguides 410 and 420 are separated (i.e., no longer overlapping vertically), the fundamental TE modes of either waveguide stay confined in their waveguide core and do not interact along the taper (although other embodiments may use TM0—just as long as they are the same). This behavior can also be understood as the modes maintaining their order from one end of an adiabatic taper to another.

Each of waveguides 410 and 420 are further coupled to waveguide mode converters 430 and 432, respectively, of section 405 of PIC 400. Converters 430 and 432 are each to transfer modes into a desired waveguide core—in this embodiment, output waveguides 440 and 442, respectively, of output ports 406 of PIC 400. Said output waveguides of output ports 406 may comprise SiN waveguides, Si wire waveguides, Si rib waveguides, etc. Thus, in this embodiment, TE0 and TM0 modes at input section 402 of PIC 400 are both efficiently transferred to TE0 modes exiting different ports at output section 406 of PIC 400. If the waveguide material and cross section at either of the outputs 442 or 440 matches the connected waveguides, 422 and 413 respectively, then one or both of the mode converters 432 and 430 may be omitted.

Thus, PIC 400 is used for polarization rotation and splitting of light received from fiber 401; the input and output waveguide types of PIC 400 may be chosen based on the intended application of the PIC. For example, the input of section 402 may comprise a silicon nitride waveguide, which is an optimal waveguide material and geometry for a spot size converter. Section 405 of PIC 400 may convert the output of both waveguides from section 404 to whatever waveguide type is utilized by other components of the PIC. For example, converters 430 and 432 may convert modes to silicon rib waveguides through series of adiabatic width tapers. In another example embodiment, converter 432 converts its waveguide back from silicon wire waveguide 420 to a silicon nitride waveguide, so that both waveguides at the output are silicon nitride.

In some embodiments of the invention, structures similar to that of 402 and 403 of PIC 400 may be used to rotate/combine light in the waveguides, rather than to split/rotate light—i.e., by operating in a "reverse" manner, where waveguides 440 and 442 would function as input waveguides, and fiber component 401 would receive light combined to comprise orthogonally polarized TE and TM modes.

Thus, the structures described above and illustrated in the aforementioned figures may be used in an optical combiner having a first waveguide to receive a first light comprising a first TE mode, and a second waveguide disposed below the first waveguide to receive a second light comprising a second TE mode and comprising a taper-shaped side. Said taper-shaped side is to adiabatically transmit the second light comprising the second TE mode to the first waveguide, the first waveguide to receive the second light as light comprising the first TE mode. In said embodiments, the horizontal offset between the first waveguide and the reverse taper-shaped side of the second waveguide comprises an offset such that the first light comprising the first TE mode is rotated to a transverse magnetic (TM) mode of the first waveguide, such that the first and second light are combined in the first waveguide to form a light comprising orthogonally polarized TE and TM modes. In other embodiments, said first and second waveguide may receive first and second TM modes, respectively, which are similarly rotated and combined to comprise orthogonally polarized TE and TM modes.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

The above described embodiments of the invention may comprise SOI or silicon based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below; in embodiments of the invention, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may devices utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as such as iron, cobalt, or yttrium iron garnet (YIG).

Crystal substrate materials provide heterogeneous PICs with a high electro-mechanical coupling linear electro optic coefficient, low transmission loss, and stable physical and chemical properties. Said crystal substrate materials may comprise, for example, lithium niobate (LiNbO3) or lithium tantalate (LiTaO3).

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. An apparatus comprising:
   a first waveguide to receive light comprising orthogonally polarized transverse electric (TE) and transverse magnetic (TM) modes; and
   a second waveguide disposed below the first waveguide and comprising a reverse taper-shaped side to adiabatically receive the TE mode of the received light from the first waveguide; wherein a horizontal offset between the first waveguide and the reverse taper-shaped side of the second waveguide comprises an offset such that the TM mode of the received light is rotated to a TE mode in the first waveguide.

2. The apparatus of claim 1, wherein the first and second waveguide comprise the same material.

3. The apparatus of claim 1, wherein the first waveguide comprises Silicon Nitride (SiN) waveguide and the second waveguide comprises a silicon (Si) waveguide.

4. The apparatus of 3, wherein the Si waveguide comprises at least one of an Si wire waveguide or an Si rib waveguide.

5. The apparatus of claim 1, further comprising:
   a spot-size converter (SSC) coupled to the first waveguide to convert an optical mode of the received light to that of the first waveguide.

6. The apparatus of claim 1, wherein the reverse taper-shaped side of the second waveguide comprises one of a segmented taper or a single taper.

7. The apparatus of claim 1, wherein the first waveguide and the second waveguide are disposed to further form a lateral offset tapered region so that the first and second waveguides transition to not overlap vertically.

8. The apparatus of claim 1, further comprising:
a waveguide mode converter, coupled to one of the first waveguide and a first output port, or the second waveguide and the second output port, to convert the mode of the received light rotated to a TE mode in the respective waveguide to a mode of the respective output port.

9. The apparatus of claim 8, wherein the first and second output ports each comprise at least one of an SiN waveguide, an Si wire waveguide, or an Si rib waveguide.

10. The apparatus of claim 1, wherein the first waveguide to receive light in one of the C-band range or the O-band range.

11. A system comprising:
a fiber component to receive light comprising orthogonally polarized transverse electric (TE) and transverse magnetic (TM) modes;
a polarization rotator and splitter comprising:
a first waveguide to receive light from the fiber component; and
a second waveguide disposed below the first waveguide and comprising a reverse taper-shaped side to adiabatically receive the TE mode of the received light from the first waveguide, wherein a horizontal offset between the first waveguide and the reverse taper-shaped side of the second waveguide comprises an offset such that the TM mode of the received light is rotated to a TE mode in the first waveguide; and
first and second output ports to receive light from the first and second waveguides of the polarization rotator and splitter, respectively.

12. The system of claim 11, wherein the first and second waveguide of the polarization rotator and splitter comprise the same material.

13. The system of claim 11, wherein the first waveguide of the polarization rotator and splitter comprises Silicon Nitride (SiN) waveguide and the second waveguide of the polarization rotator and splitter comprises a silicon (Si) waveguide.

14. The system of 13, wherein the Si waveguide of the polarization rotator and splitter comprises at least one of an Si wire waveguide or an Si rib waveguide.

15. The system of claim 11, the polarization rotator and splitter further comprising:
a spot-size converter (SSC) coupled to the first waveguide to convert an optical mode of the received light from that of the optical fiber component to that of the first waveguide.

16. The system of claim 11, wherein the reverse taper-shaped side of the second waveguide of the polarization rotator and splitter comprises one of a segmented taper or a single taper.

17. The system of claim 11, wherein the first waveguide and the second waveguide of the polarization rotator and splitter are disposed to further form a lateral offset tapered region so that the first and second waveguides transition to not overlap vertically.

18. The system of claim 11, further comprising:
a waveguide mode converter, coupled to one of the first waveguide of the polarization rotator and splitter and the first output port, or the second waveguide of the polarization rotator and splitter and the second output port, to convert the mode of the received light rotated to a TE mode in the respective waveguide to a mode of the respective output port.

19. The system of claim 11, wherein the first and second output ports each comprise at least one of an SiN waveguide, an Si wire waveguide, or an Si rib waveguide.

20. The system of claim 11, wherein the system comprises a data transmission system and the fiber component, the polarization rotator and splitter, and the first and second output ports are included in a receiver.

21. The system of claim 11, wherein the fiber component to receive light in one of the C-band range or the O-band range.

22. An optical combiner comprising:
a first waveguide to receive a first light comprising a first transverse electric (TE) mode; and
a second waveguide disposed below the first waveguide to receive a second light comprising a second TE mode and comprising a taper-shaped side to adiabatically transmit the second light comprising the second TE mode to the first waveguide, the first waveguide to receive the second light as light comprising the first TE mode;
wherein the horizontal offset between the first waveguide and the taper-shaped side of the second waveguide comprises an offset such that the first light comprising the first TE mode is rotated to a transverse magnetic (TM) mode of the first waveguide, such that the first and second light are combined in the first waveguide to form a light comprising orthogonally polarized TE and TM modes.

23. The optical combiner of claim 22, wherein the first and second waveguide comprise the same material.

24. The optical combiner of claim 22, wherein the first waveguide comprises Silicon Nitride (SiN) waveguide and the second waveguide comprises a silicon (Si) waveguide.

25. The optical combiner of claim 23, wherein the Si waveguide comprises at least one of an Si wire waveguide or an Si rib waveguide.

26. The optical combiner of claim 22, wherein the taper-shaped side of the second waveguide comprises one of a segmented taper or a single taper.

27. The optical combiner of claim 22, wherein the first waveguide and the second waveguide are disposed to further form a lateral offset tapered region so that the first and second waveguides transition to not overlap vertically.

* * * * *